United States Patent
Belansky

[15] 3,656,320
[45] Apr. 18, 1972

[54] CLUTCH CONTROLLED DRIVE MECHANISM

[72] Inventor: Rudolph J. Belansky, Elmhurst, Ill.
[73] Assignee: Illinois Tool Works Inc., Chicago, Ill.
[22] Filed: July 13, 1970
[21] Appl. No.: 54,437

[52] U.S. Cl. .................................................. 64/24, 192/8
[51] Int. Cl. .................................................. F16d 3/10
[58] Field of Search .................... 192/8, 144; 188/134; 64/24

[56] References Cited

UNITED STATES PATENTS

| | | | |
|---|---|---|---|
| 2,925,157 | 2/1960 | Davis | 192/8 |
| 3,243,023 | 3/1966 | Boyden | 192/8 |
| 3,536,169 | 10/1970 | Arnold | 192/8 X |

Primary Examiner—Edward G. Favors
Attorney—Olson, Trexler, Wolters & Bushnell

[57] ABSTRACT

The present invention relates generally to clutch controlled drive mechanisms and particularly to a novel, self-contained drive mechanism or unit wherein power transmitted from the input shaft means to the output shaft means is governed through the agency of clutch means. The embodiment of the invention disclosed herein contemplates a self-contained unit comprising a housing, input shaft means and output shaft means rotatably supported in said housing, clutch means in said housing for locking said input and said output shaft means against rotation with respect to the housing, and cam means operable as an incident to a limited degree of relative rotative movement experienced by the input and output shaft means for overcoming the locking effectiveness of the clutch means.

21 Claims, 12 Drawing Figures

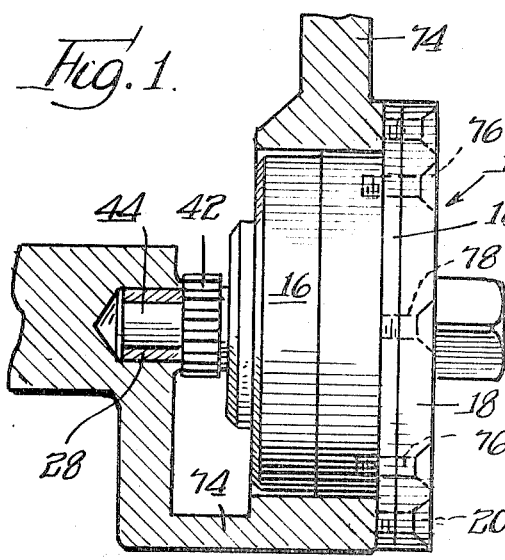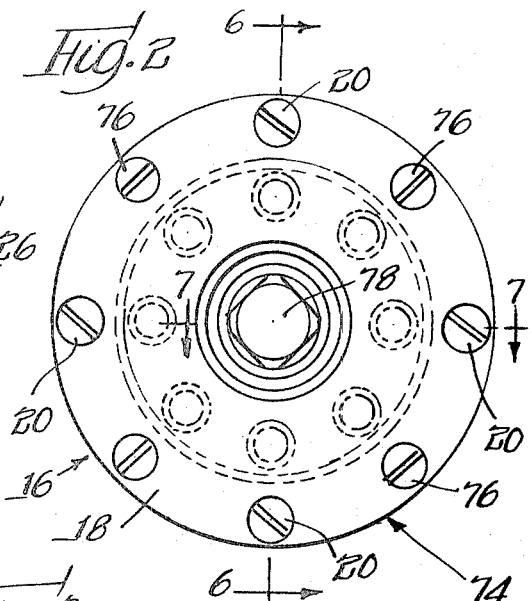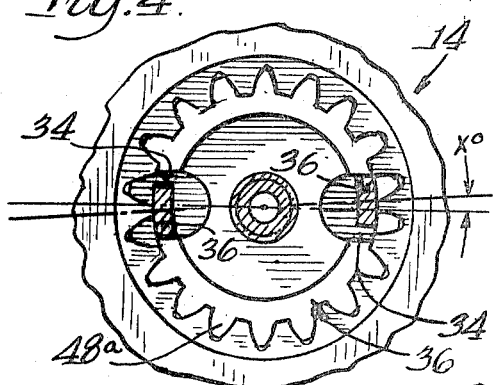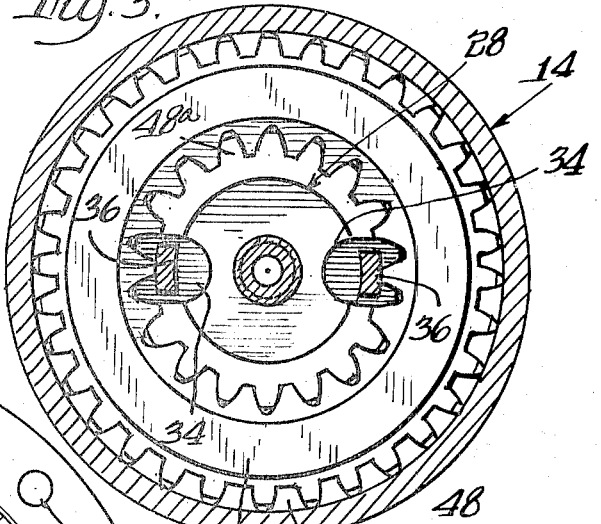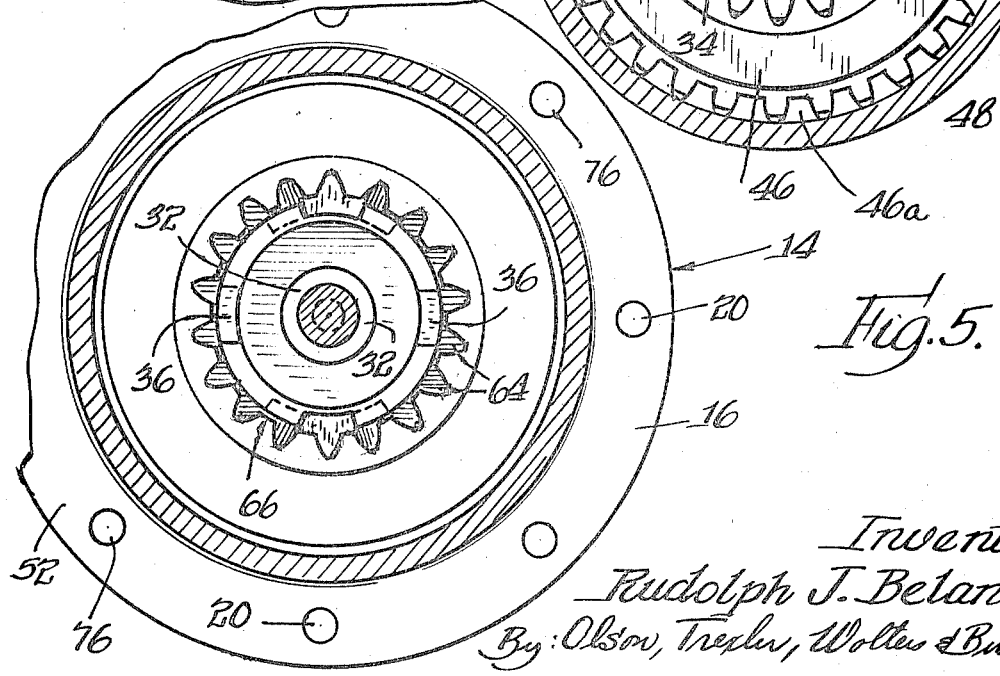

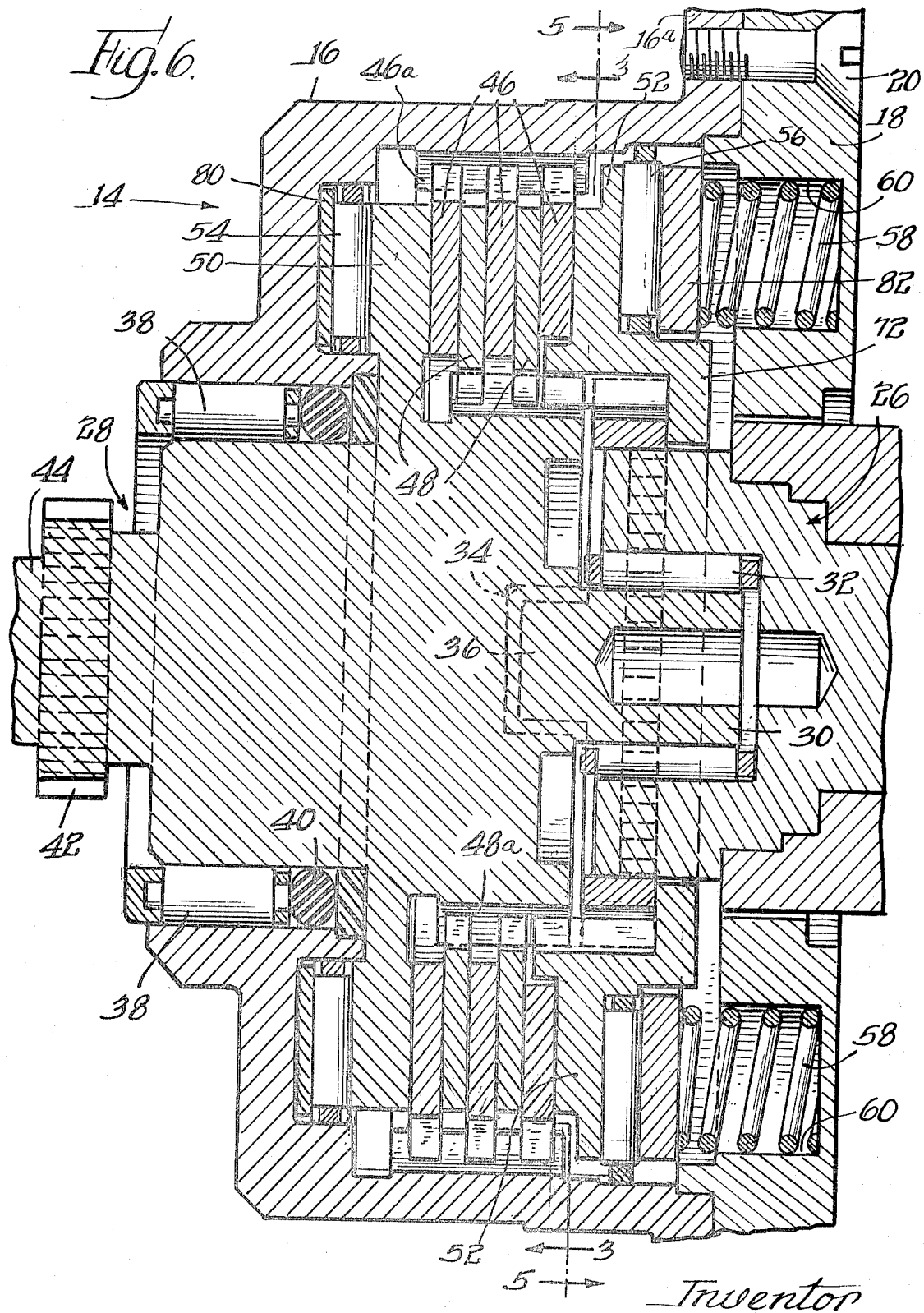

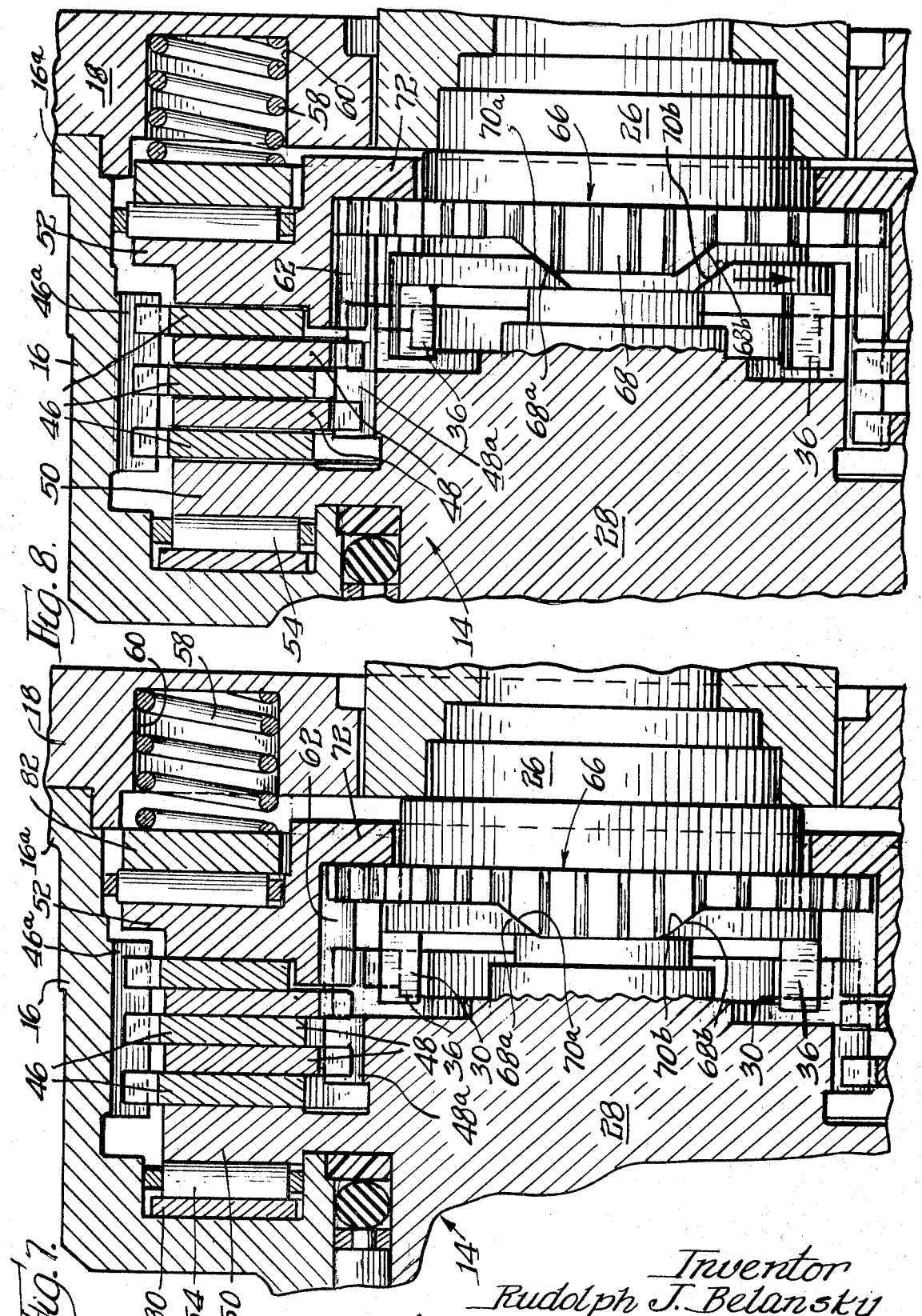

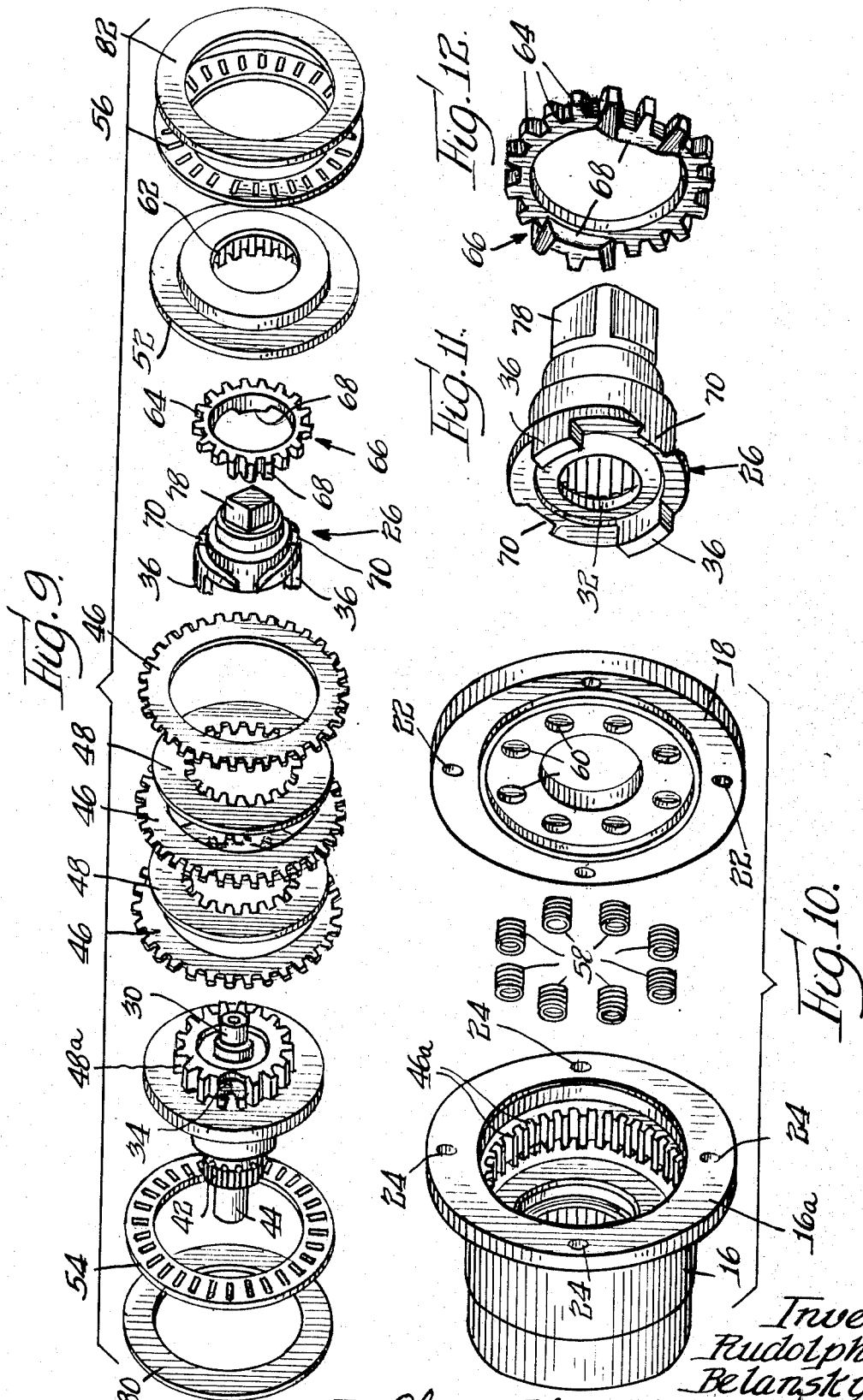

CLUTCH CONTROLLED DRIVE MECHANISM

SUMMARY OF THE INVENTION

When rotation is imparted to a driven member from a rotary driving member coupled therewith such as a rotary drive shaft and the driving torque is suddenly arrested, it is not uncommon for the driven member to experience further rotation resulting from the forces of inertia. There are many instances where, it is essential that such forces of inertia be immediately overcome so that the driven member will experience substantially no further rotation or movement once the driving torque has ceased to function. The present invention is concerned with a very practical solution to this problem by providing a novel, compact self-contained drive mechanism wherein movement of a driven member will cease substantially instantaneously upon the cessation of the driving torque. More particularly the present invention contemplates a self-contained drive mechanism of the type referred to above wherein a novel arrangement of a clutch is employed to assure instantaneous discontinuance of movement of the driven member.

It is a further object of the present invention to provide a self-contained driving mechanism of the type referred to above, wherein the clutch serves as an effective braking or locking means to prevent rotation of the input and output shafts relative to the fixed housing.

The present invention also contemplates a novel and efficiently operable drive mechanism wherein limited relative rotation of the input and output shaft means will result in overcoming the braking effectiveness of the clutch.

It is a further and more specific object of the present invention to incorporate in the above-mentioned self-contained drive mechanism a novel cam arrangement which will function during a limited degree of relative rotation between the input and output shafts for substantially instantaneously overcoming the braking effectiveness of the aforesaid clutch.

BRIEF DESCRIPTION OF THE DRAWINGS

The foregoing and other objects and advantages will be more apparent from the following detailed description when considered in connection with the accompanying drawings wherein:

FIG. 1 is a side elevational view of one embodiment of a self-contained drive mechanism contemplated by the present invention;

FIG. 2 is an end view of the drive mechanism as seen from the right of FIG. 1;

FIG. 3 is a transverse sectional view of the drive mechanism taken substantially along the line 3—3 of FIG. 6;

FIG. 4 is a view similar to the central proportion of the disclosure in FIG. 3, to illustrate the manner in which the input and output shafts experience a limited degree of relative rotation whereby to govern the locking or braking effectiveness of the clutch;

FIG. 5 is a transverse sectional view taken along the line 5—5 of FIG. 6, which line is coincident with the previously mentioned section line 3—3 except that section 5—5 is viewed from the left of FIG. 6, whereas the section 3—3 is viewed from the right of FIG. 6;

FIG. 6 is a central sectional view taken longitudinally or axially of the drive mechanism substantially along the line 6—6 of FIG. 2;

FIG. 7 is an enlarged fragmentary sectional view taken substantially along the line 7—7 of FIG. 2, more clearly to illustrate the relationship of the clutch discs and the disc controlling cam device when the clutch discs are engaged and thereby function to lock the input and output shaft means against relative rotation with respect to the fixed housing;

FIG. 8 is an enlarged fragmentary sectional view similar to FIG. 7, disclosing the disengaged position of the clutch discs when the above-mentioned cam device is shifted;

FIG. 9 is a perspective exploded view of the elements contained within the housing;

FIG. 10 is a perspective exploded view of the fixed housing and closure plate thereof together with the coil springs employed to urge the clutch discs into frictional engagement;

FIG. 11 is a perspective view of the input drive shaft means, more clearly to illustrate the axially extending oppositely disposed lugs thereof which are adapted to interlock with corresponding recesses in the output or driven shaft means and the diametrically disposed cam sections; and, FIG. 12 is a perspective view of the cam disc, illustrating the cam sections thereof which cooperate with the above-mentioned complementary, diametrically disposed cam sections associated with the input shaft means.

DESCRIPTION OF A PREFERRED EMBODIMENT

Referring now to the drawings more in detail wherein like numerals have been employed to designate similar parts throughout the various figures, it will be noted that one embodiment of the novel self-contained drive mechanism contemplated by the present invention is designated generally by the numeral 14. The drive mechanism 14 includes a housing 16 adapted to be closed at one extremity by a cover or end plate 18, secured to a flange 16a of the housing 16 by means of a plurality of fastening screw members 20 extending through complementary apertures 22 in the cover member 18 FIG. 10. The entering extremities of the screw members 20 are received by complementary internally threaded apertures 24 in the housing flange 16a.

An input shaft member 26 and an output shaft member 28 are mounted for rotation within the housing 16. An extension 30 of the shaft member 28 is telescopically associated with a roller bearing 32 fitted within the inner end of the input shaft member 26, FIG. 6. The inner face of the output bearing member 28 is formed with a pair of diametrically exposed recesses or slots 34 for accommodating complementary diametrically exposed driving elements or lugs 36 extending axially from and formed integral with the inner face of the input shaft member 26. Particular attention is directed to the fact that a predetermined amount of play is provided between the walls defining the slots 34 and the opposite circumferentially disposed surfaces of the driving lugs 36. The purpose of this arrangement will be more apparent as the description progresses, and it will suffice to say at this point that the loose fit of the lugs 36 within the slots 34 permits a limited degree of relative rotative movement of the input and output shaft members 26 and 28. The output shaft member 28 is mounted within antifriction roller bearings 38 carried by the housing 16. An O-ring 40 provides a seal between the internal mounting surface of the housing 16 and the adjacent periphery of the output shaft member 28. In the disclosed embodiment the output shaft member 28 has formed integral therewith, externally positioned gear teeth 42 and a shaft extension 44.

From the description thus far it will be apparent that rotation experienced by the input drive shaft 26 will cause rotation of the output shaft member 28 due to the direct coupling between the inner extremities of said shafts namely, the interengagement of the lugs 36 within the slots 34. To provide a brake or lock which under certain conditions will prevent the rotation of the shaft members 26 and 28 within the housing 16, a plurality of externally toothed clutch disc members are employed, each being designated by the numeral 46. Interposed between adjacent discs 46 are internally toothed clutch disc members 48. The external teeth of the disc members 46 are adapted to mesh with complementary teeth or splines 46a along the inner periphery of the housing 16. The internal teeth of the clutch disc members 48 are adapted to mesh with complementary longitudinal teeth or splines 48a formed along the external periphery of the inner extremity of the output shaft member 28. The aforesaid annular clutch disc members 46 and 48 are positioned between a flange 50 extending radially from and formed integral with the output shaft member 28, and a collar 52 which encircles the periphery of the inner extremity of the input shaft member 26, FIG. 6. The opposite surface of the flange 50 bears against annularly disposed roller bearings 54 and the corresponding surface of the collar 52 bears against a plurality of similar annularly disposed roller bearings 56. A plurality of annularly arranged coil springs 58 mounted within complementary apertures 60 provided along the inner face of the cover member 18 constantly urge an annular clutch disc member 82 against the roller bearings 56, which in turn transmit clamping pressure to the clutch disc members 46 and 48 through the collar 52. When the full force of the coil springs causes impingement of the abutting surfaces of the disc members 46 and 48, the output shaft 28 will be firmly locked against rotation with respect to the housing 16.

Under such circumstances the input shaft member 26 is also locked against rotation with respect to the housing 16. This results from the interlocking of longitudinal splines 62 along the inner periphery of the collar 52 with complementary external teeth 64 of an annular cam device indicated generally by the numeral 66. A pair of diametrically positioned cam sections or axial projections 68 interlock with recessed cam sections 70 formed along the outer periphery of the input drive shaft 26. It will be noted that these recessed cam sections are spaced 90° from the next adjacent driving lugs 36, FIG. 11. To more clearly understand the interlocking engagement of the cam sections 68 of the annular cam device 66 with the recessed cam sections 7, reference is made to FIG. 7. FIG. 7 is an enlarged central sectional view corresponding with the upper portion of the central section illustrated in FIG. 6. In FIG. 6 the structural nature of the interlocking cam sections 68 and 70 are not clearly apparent. In FIG. 7 these cam sections 68 and 70 are shown in elevation and in fully interlocked relation, although the cam surface may be slightly spaced, if desired. The cam section 68 is formed with oppositely disposed cam surfaces 68a and 68b which engage complementary cam surfaces 70a and 70b respectively of the recessed cam section 70.

When the cam sections 68 and 70 are fully interlocked as shown in FIG. 7, and the input and output shaft members are locked against rotation as above described, the coupling lugs 36 of the input shaft member, and the complementary recesses 34 of the output shaft member 28 occupy the relations shown in FIG. 3. If a rotative force in the direction indicated by the arrow in FIG. 8, is applied to the input shaft member 26, the annular cam device 66 will be shifted axially from the position shown in FIG. 7, to the position shown in FIG. 8. Thus the cam device 66 is moved into engagement with an inner annular section 72 of the collar 52, so as to shift said collar to the right, FIGS. 6 and 8, against the force exerted by the coil springs 58. The movement of the collar 52 is sufficient to release the locking or braking effectiveness of the clutch discs or plates 46 and 48. The input shaft member 26 is now free to impart rotative torque to the output shaft 28 through the direct coupling provided by the interlocking lugs 36 and complementary slots 34. Immediately upon the discontinuance of the application of rotative force to the input shaft member 26, the coil springs will cause the clutch discs to lock or brake any further movement of the output shaft member 28. The limited degree of relative rotation of the input and output shaft members indicated by the X° in FIG. 4 is sufficient to longitudinally shift the annular cam device 66 from the position shown in FIG. 7 to the clutch disengaging position illustrated in FIG. 8. The extent of axial shifting of the device 66 from the fully interlocked position, as viewed in FIGS. 7 and 8, is limited by the engagement of the inner flange 72 of the collar 52 with the inner surface of the cover plate 18. This movement is insufficient to effect the complete disengagement of the cam section 68 from the companion recessed cam section 70 of the input shaft member 26. In other words the input shaft member 26 is rotatable with respect to the output shaft member 28 only to the extent that lug 36 interlocks with slot 34 at which time the locking or braking effectiveness of the clutch is already overcome.

It should be understood that the above described self-contained drive mechanism 16 may be mounted in a fixed position in a manner which would be governed by its intended use. A series of annularly distributed fastening screws 76 extend through the covering plate 18 and the housing flange 16a into the frame member 74. Obviously the invention of the present application is directed to the clutch controlled drive mechanism or unit as distinguished from the frame or support to which it may be attached. In the disclosed embodiment for example, the shaft extension 44 of the output shaft member 28 projecting beyond the confines of the housing 16 is rotatably supported by the frame 74. The gear teeth 42 formed integral with the output shaft member 28 is illustrative of one practical means for coupling the output shaft to the shiftable work member (not shown). Likewise in the disclosed embodiment the input shaft member 26 is provided with an axial extension 80 of polygonal cross-section projecting outwardly from the housing and designed to accommodate a suitable member (not shown) for imparting rotation to the input shaft member 26. It will also be apparent that rotative torque may be applied to the input shaft member 26 in either direction. The complementary cam surfaces 68a and 70a are brought into play when limited rotative movement is imparted to the input shaft member 26 in the direction indicated by the arrow in FIG. 8. Likewise if the disengagement of the cam discs 46 and 48 is to occur as an incident to limited rotative movement imparted to the input shaft 26 in the opposite direction, the cam surfaces 68b and 70b are brought into play.

From the foregoing it will be apparent that the present invention contemplates a unique and very practical device in the form of a self-contained clutch controlled drive mechanism or unit which, upon the discontinuance of the application of rotative force to the input shaft member will result in substantially instantaneous engagement of the clutch discs. In this manner the rotation of the output shaft member may be instantaneously interrupted at a predetermined interval. With the above described mechanism, extreme accuracy in the establishment of a predetermined position of a driven work member is assured. Likewise the ease with which the clutch mechanism may be disengaged is greatly facilitated by the use of the above described novel annular cam device. The self-contained units of the type herein described have proven very satisfactory for their intended use. Obviously the torque capability of the clutch depends on various factors such as the angular relationship of the cam surfaces, the extent of pressure developed by the coil springs, surface characteristics of the clutch discs or plates, lubrication, as well as the applied input and output torque. The efficient functioning of the above described clutch arrangement is greatly facilitated by the use of the above mentioned race rollers 50 and 56, an annular disc, or thrust plate member 80, for the race rollers 54 and a similar annular thrust plate 82 interposed between the coil springs 58 and the race rollers 56. To vary the effectiveness of the coil springs, suitable shims may be inserted between the clutch housing and the annular thrust members or races. In the disclosed embodiment the coacting cams are provided with substantially flat cam surfaces. Obviously such surfaces could be of helical or generated shape.

I claim:

1. A clutch controlled drive mechanism including housing means, input shaft means rotatably supported by said housing means, output shaft means rotatably supported by said housing means in coaxial relation with said input shaft means and having a section fixed against axial movement, means for establishing direct coupling of said input and output shaft means and permitting a limited degree of relative rotative movement thereof, clutch means in said housing comprising a plurality of adjacently positioned clutch discs and a spring biased pressure member directed against said clutch discs for locking said input and output shaft means against rotation with respect to said housing, alternate clutch discs being mounted in said housing against rotational movement and other of said clutch discs being mounted on said axially fixed section of said output shaft means, and cam means operable as an incident to the limited degree of relative rotative movement experienced by said input and output shaft means for overcoming the locking effectiveness of said clutch means.

2. A clutch controlled drive mechanism as set forth in claim 1, wherein the cam means is operable as an incident to the limited degree of rotative movement experienced by the input shaft means.

3. A clutch controlled drive mechanism as set forth in claim 1, wherein the directly coupled portions of the input and output shaft means, the clutch means, and the cam means are enclosed as a self-contained unit within said housing, one extremity of said input shaft means projects outwardly of said housing, and one extremity of said output shaft means projects outwardly of said housing.

4. A clutch controlled drive mechanism as set forth in claim 1, wherein the housing means is provided with means for attaching the housing in a fixed position to a support means.

5. A clutch controlled drive mechanism as set forth in claim 1, wherein the housing includes a detachable cover plate.

6. A clutch controlled drive mechanism as set forth in claim 1, wherein the clutch means includes spring means for maintaining the locking effectiveness thereof.

7. A clutch controlled drive mechanism as set forth in claim 1, wherein the clutch means includes a plurality of adjacently positioned clutch discs and yieldable means for urging said discs toward said output shaft means into frictional engagement with each other.

8. A clutch controlled drive mechanism as set forth in claim 1, wherein the clutch means includes a plurality of disc members and a plurality of annularly disposed coil springs for urging said disc members toward said output shaft means into frictional engagement.

9. A clutch controlled drive mechanism as set forth in claim 1, wherein the clutch means includes a plurality of disc members, certain of which are secured against rotation along their outer peripheries, and certain others are interlocked along their inner peripheries with the output shaft means.

10. A clutch controlled drive mechanism as set forth in claim 1, wherein the clutch means includes annular pressure plate means, spring means for urging said annular pressure plate means axially, and the cam means is in the form of an annular cam device interlocked along its outer margin with the inner margin of said annular pressure plate means.

11. A clutch controlled drive mechanism as set forth in claim 1, wherein the means for establishing direct coupling of said input and output shaft means comprises interlocking lug and slot means in which the slot has a circumferential width greater than the circumferential width of the lug means to permit limited relative rotation between the input and output shaft means.

12. A clutch controlled drive mechanism as set forth in claim 11, wherein the cam means includes cam surfaces on the input shaft means spaced circumferentially from said lug means.

13. A clutch controlled drive mechanism as set forth in claim 11, wherein said lug means includes diametrically disposed lug and slot means, and the cam means includes diametrically disposed cam surfaces associated with the input shaft means and an annular cam device having diametrically disposed cam surfaces cooperatively positioned with respect to said first mentioned diametrically disposed cam surfaces.

14. A clutch controlled drive mechanism as set forth in claim 1, wherein the housing means is formed with a plurality of longitudinal splines along an inner periphery, and the clutch means includes a plurality of disc members having outer peripheral teeth meshing with said splines whereby to secure said clutch disc members against rotation with respect to said housing.

15. A clutch controlled drive mechanism as set forth in claim 14, wherein the clutch means also includes a plurality of annular disc members having internal peripheral teeth, and the output shaft means is provided with a plurality of external longitudinal splines meshing with said internal disc teeth.

16. A clutch controlled drive mechanism as set forth in claim 1, wherein the cam means includes an axially shiftable annular cam device associated with said input shaft means, and abutment means for limiting the extent to which said annular cam device may be axially shifted with respect to said input shaft means.

17. A clutch controlled drive mechanism including a housing, input shaft means rotatably supported by said housing, output shaft means rotatably supported by said housing in coaxial relation with said input shaft means and having a section fixed against axial movement, companion interlocking lug and slot means for establishing direct coupling of said input and said output shaft means the circumferential width of the slot being sufficiently greater than the circumferential width of a companion lug to permit a limited degree of relative rotative movement of said input and output shaft means, clutch means in said housing for locking said output shaft means against rotation with respect to said housing, said clutch means including a plurality of annular clutch discs, certain of which are secured against relative rotation with respect to the housing and certain others of which are interlocked with said axially fixed section of the output shaft means, said housing including pressure plate spring means, annular pressure plate means interposed between the clutch disc means and said pressure plate spring means for urging said pressure plate means toward said clutch disc means, cam means operable as an incident to the limited degree of relative rotative movement experienced by said input and output shaft means, and means responsive to said cam means for urging said pressure plate means in a direction opposed to the force exerted by said spring means for overcoming the locking effectiveness of said clutch means.

18. A clutch controlled drive mechanism as set forth in claim 17, wherein the housing includes longitudinal splines, interlocking with external clutch disc teeth for securing said discs against relative rotation with respect to the housing.

19. A clutch controlled drive mechanism as set forth in claim 17, wherein the cam means includes cam surface means on the input shaft means and coacting cam surface means on an axially re-shiftable annular cam device coupled with the means for urging the pressure plate means in a direction opposed to the force exerted by the spring means.

20. A clutch controlled drive mechanism as set forth in claim 18, wherein the axially shiftable annular cam device is peripherally coupled with said pressure plate means.

21. A clutch controlled drive mechanism as set forth in claim 17, wherein the clutch means includes annularly disposed anti-friction bearing means disposed on opposite sides of said adjacently positioned clutch discs.

* * * * *